United States Patent [19]
Clark

[11] 4,080,296
[45] Mar. 21, 1978

[54] HOLLOW FIBER PERMEATOR
[75] Inventor: George B. Clark, Clayton, Calif.
[73] Assignee: The Dow Chemical Company, Midland, Mich.
[21] Appl. No.: 782,110
[22] Filed: Mar. 28, 1977
[51] Int. Cl.² .................................... B01D 31/00
[52] U.S. Cl. .................... 210/323 R; 210/321 R; 210/433 M
[58] Field of Search ............... 55/16, 158; 210/321 R, 210/323 R, 433 M

[56] References Cited
U.S. PATENT DOCUMENTS

| 3,503,515 | 3/1970 | Tomsic | 210/321 R |
| 3,953,334 | 4/1976 | Brun et al. | 210/433 M |

Primary Examiner—Frank A. Spear, Jr.
Attorney, Agent, or Firm—Robert R. Stringham

[57] ABSTRACT

Hollow fiber permeator units which are individually capable of producing 250,000 gallons per day of processed water and which can be economically made are disclosed. An elongate, ordered bundle of selectively permeable hollow fiber lengths passing through a central tubesheet is formed around a perforated feed tube containing a coaxial permeate conduit which is connected to permeate collecting bores in the tubesheet. The resulting assembly is enclosed in a filament-wound casing interrupted only by the tube portions extending from its ends.

12 Claims, 3 Drawing Figures

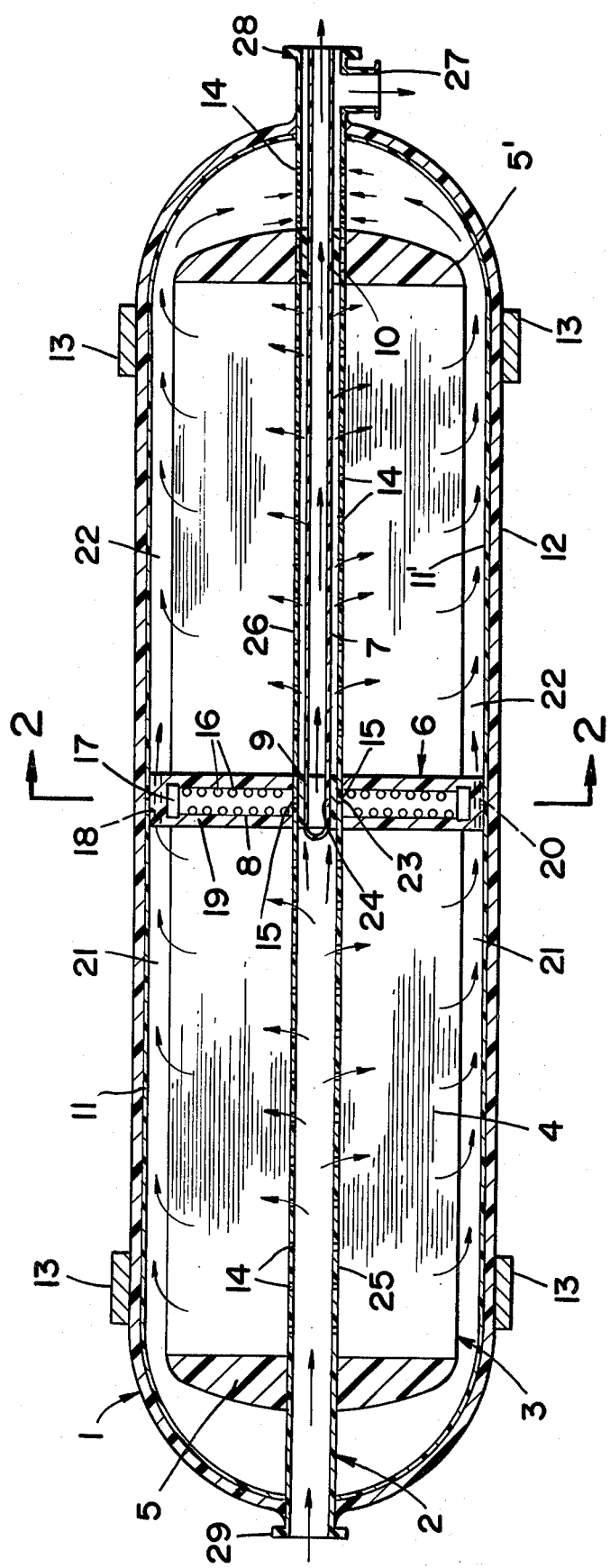
FIG_1
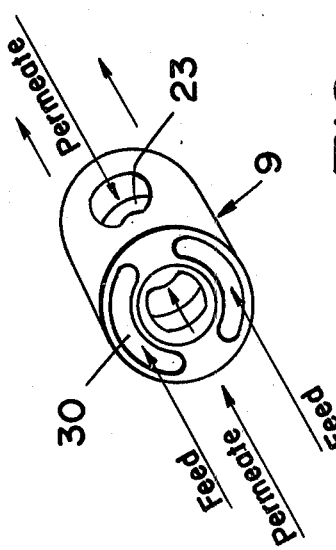
FIG_3

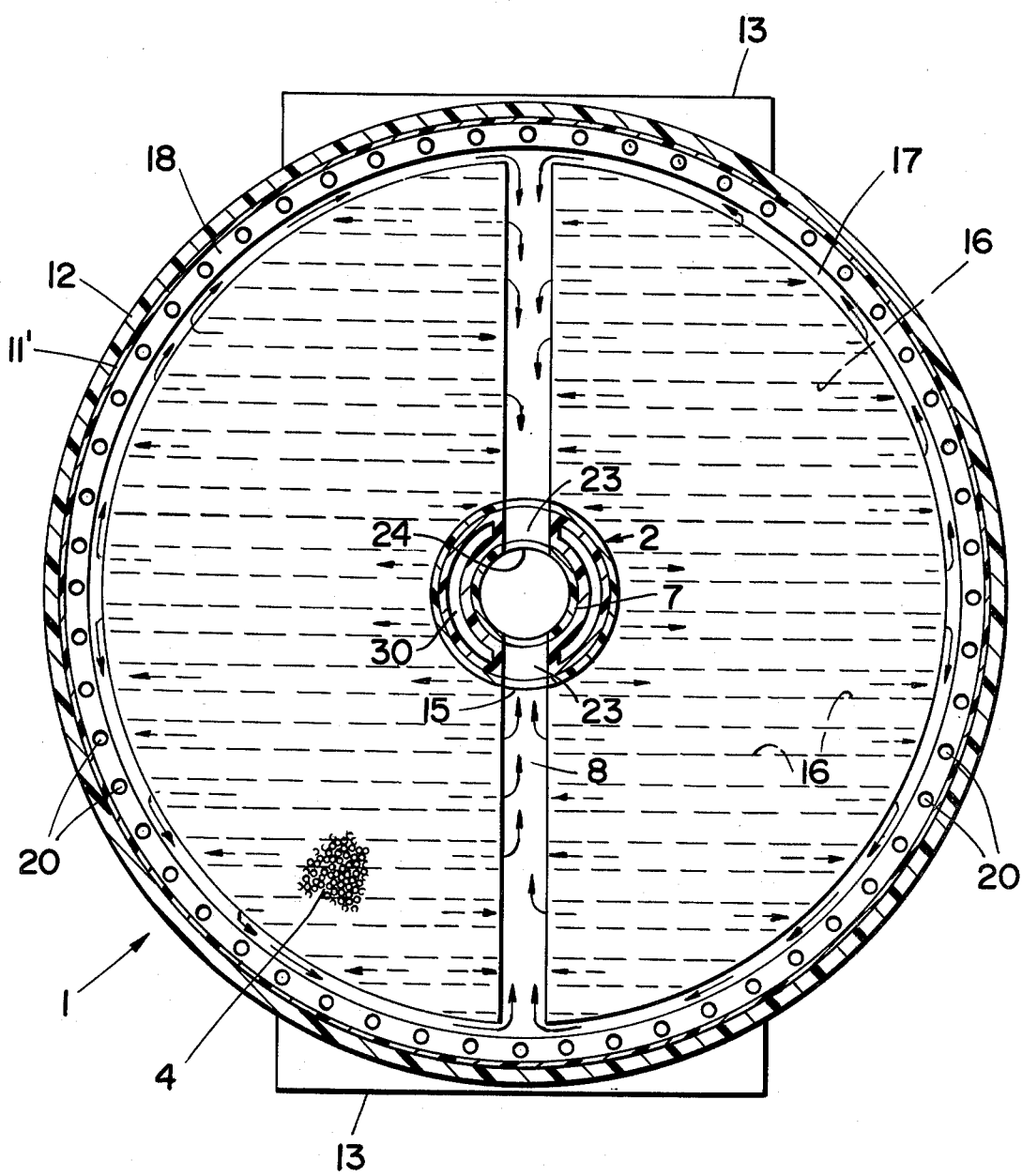
FIG_2

HOLLOW FIBER PERMEATOR

BACKGROUND OF THE INVENTION

Permeability separation devices (permeators) in which the membrane takes the form of selectively permeable, hairlike, hallow fiber lengths are now well known. The latter membrane form is particularly suited for the recovery of water from brines by reverse osmosis because the fibers do not require support against the large transmembrane pressure differentials which must be employed in this process. However, the economies of fabrication costs and space utilization that might be anticipated for large scale units of this type have not been realizeable because the cost for adequately pressure-resistant casings (and associated plumbing), of conventional design, goes up disproportionately as the size of the unit is increased. On the other hand, the use of a number of smaller scale units in parallel results in more cumbersome and expensive external plumbing and instrumentation. Economically priced water of adequate quality for domestic and industrial use is unavailable or is becoming increasingly less available in many parts of the world. It is thus highly desirable to be able to recover such water from the oceans, from brackish water bodies, etc., at the lowest possible cost per unit volume.

The primary object of the present invention is to provide a hollow fiber permeator unit which costs less, per unit volume of capacity, to make and to use.

An additional object is to provide a hollow fiber permeator that is simpler to fabricate, more reliable and easier to maintain than conventional permeability separatory devices.

A further object is to reduce the requirement for expensive materials and fabrication procedures in the manufacture of hollow fiber permeators.

Still another object is to provide a permeator design that is particularly suited for large scale units capable of processing hundreds of thousands of gallons of fluid per day.

It is also an object to provide a hollow fiber permeator which may be operated in a pressure balanced condition, i.e., with equal fluid pressures on the opposed faces of the tubesheet.

A particular object is to provide a design which avoids lateral interruptions in the casing integrity and utilizes the feed conduit/tubesheet assembly for additional casing stiffening and support, thereby making possible the use, in economical amounts, of lightweight, high stength non-metallic casing materials.

Another object is to provide a hollow fiber permeator in which the length of the flow path between the fibers is minimized and feed "polarization" tendencies are reduced.

An additional oject is to eliminate or drastically reduce the need for baffles, seals and internal hardware in hollow fiber permeator units.

It is also an object to provide a large-scale permeator design that can readily be adapted to small-scale devices and which is suitable for all manners of permeability separatory processes that may be carried out with hollow fibers.

Other objects will be made apparent to those skilled in the art by the following disclosure.

SUMMARY OF THE INVENTION

FIG. 1 of the drawings is a longitudinal sectional view of a permeator of the present invention in which in which a plurality of generally parallel, selectively permeable hollow fiber lengths (a fiber "bundle") and a central radial tubesheet, are disposed around a core consisting of a perforated feed conduit. A permeate egress conduit is positioned coaxially in the feed conduit and connected to permeate collecting bores in the tubesheet. The fiber, tubesheet and core assembly is sealed in a fiber glass casing and a terminal, partitioned-off portion of the feed conduit is utilized for egress of the processed feed which has passed through the fiber bundle.

FIG. 2 of the drawings depicts a cross-section along line 2—2 in FIG. 1 and includes details of a connecting block means for conveying permeate from the tubesheet through the core, in crossflow to the surrounding feed fluid stream, to the permeate agress conduit.

FIG. 3 is a perspective drawing of the connecting block.

Broadly, the present invention may be defined as a hollow fiber permeability separator device comprising:
A. a casing having the general shape of an elongated cylinder closed at each end by a hemisphere, said casing being uninterrupted except at the ends thereof;
B. a rigid, hollow core extending through said casing and having feed inlet and outlet ends protruding from and sealingly engaged with the ends of the casing, the axes of the casing and core generally coinciding;
C. a plurality of fluid-permeable, hollow fiber lengths disposed as a non-random bundle around said core, within said casing;
D. a radial tubesheet which is greater in diameter than said bundle, surrounds and sealingly engages an intermediate portion of said core and has adjacent, intermediate portions of said fiber lengths potted therein,
said tubesheet having opposed, generally parallel faces from each of which unpotted portions of said fiber lengths extend and a peripheral portion extending radially outward beyond said fiber bundle,
said peripheral portion of the tubesheet being spaced apart from said casing or being pierced from one of said faces to the other by a plurality of grooves in or bores adjacent to the peripheral surface between said faces,
said intermediate core portion being pierced by at least one pair of opposed bores and said tubesheet defining internal passageways into which the lumens of said fiber lengths open and which are adapted to convey permeate from said lumens to said bores in the intermediate core portion;
E. radial wall members at each end of said bundle, surrounding and sealingly engaged with said core and having potted therein the ends of said fiber lengths,
the wall member adjacent the outlet end of said core being positioned relative to said casing and so adapted that treated feed may pass between the casing and said wall member, and
the portions of the core engaged with said wall members and with the tubesheet, and the portion of the core between its inlet and the adjacent wall member being effectively fluid impervious but the rest of said core being adapted to permit flow of fluid to be treated into said bundle from said core or flow of treated fluid into said core from said space between the casing and the wall member adjacent said outlet, F. a permeate egress pipe disposed generally coaxially within said core and, together therewith, defining a feed passageway, of generally annular cross-section, extending from the core outlet at least to the plane of said tubesheet face furthest therefrom, the portion of said pipe surrounded by the tubesheet being pierced by at least one pair of opposed bores for permeate ingress thereto but being otherwise closed to fluid entry;

G. a partition sealingly engaged with the core and said pipe and dividing said feed passageway into a terminal section extending from said core exit to the adjacent wall member and an inner section extending at least from that wall member to said face plane;

H. conduit means disposed within but not blocking off said feed passageway and connecting said bores in the intermediate core portion with the permeate ingress bores in said pipe;

said core outlet and the adjacent pipe end being adapted to discharge treated fluid and permeate, respectively, as separate streams.

The casing preferably comprises an inner structure consisting of two abutted preforms which are slipped on at each end of the core/bundle/tubesheet assembly and meet at the "equator" of the tubesheet, plus an integral outer shell formed in situ by winding high strength, resin impregnated fiber rovings onto the preforms, and curing. In this embodiment, the inner surface of the casing preferably makes substantial contact with the peripheral surface of the tubesheet; the tubesheet body and core assembly thus stiffens the casing against flexure. The preforms preferably are molded halves.

DETAILED DESCRIPTION OF THE EMBODIMENT

Referring again to the drawings, FIG. 1 depicts a longitudinal cross-section of the preferred embodiment (of the invention) described above. The permeator, indicated generally by the numeral 1, consists of a core 2, a bundle 3 of hollow fibers 4, the ends of which are potted in resinous wall members 5,5', a central "tubesheet" 6, permeate egress pipe or conduit 7 connected to an internal passageway 8 in the tubesheet by a ported, cylindrical connecting block 9, a thick partition 10 between core 2 and pipe 7, two inner casing preform halves 11,11', and an outer, filament-wound casing shell 12 to which four stacking members 13 are bonded. The portion of the core wall between the feed inlet and wall member 5 is fluid impervious but the rest of the core wall, except for the portions surrounded by the tubesheet and wall member 5' are porous or are pierced by a plurality of openings 14 through which the fluid to be treated (or which has been treated) may pass. The core wall portion between the tubesheet 6 and the connecting block 9 (see FIG. 2 also) is pierced by two relatively large, diametrically opposed openings 15 which register with the inner ends of the upper and lower sections of passageway 8. The fiber lengths 4 are divided into left and right halves by, and open into bores 16, each of which is connected at one or both ends with the passageway 17 defined by a hoop-shaped, bonded-on cap member 18 and the adjacent, routed-out, periphery of a body member 19, which together with the cap, constituted tubesheet 6. The outer ends of passageway 8 connect with passageway 17 and cap 18 is pierced by a plurality of small transverse bores 20 through which fluid may pass from space 21 to space 22. Bores 16 are of such number and are so sized and located as to ensure that the lumen of essentially all of the fiber lengths are opened for permeate egress.

Connecting block 9 (which can be better visualized from FIG. 3) functions in the manner of the type of cross-flow fitting commonly referred to as a "spider". The block is shaped to define short, radial passageways 23,23' connecting the inner ends of passageway 8 with co-aligned openings 24 in the otherwise closed end of pipe 7, and two longitudinal passageways (not visible in FIG. 1) which connect the left-hand portion 25 of core 2 with the passageway between the exterior surface of pipe 7 and the adjacent interior surface of the right-hand portion 26 of core 2. The right-hand ends of the core and egress pipe 7 are adapted by means of side connection 27 and flange 28 to separately discharge treated feed and permeate, respectively. The left end of the core is also fitted with a connecting flange 29.

Referring to FIGS. 2 and 3, longitudinal passageways 30 through block 9 are seen to be generally kidney-shaped in cross-section and to be located above and below the short radial passage ways 23,23' connecting passageway 8 with pipe 7. The right hand row of bores 16 in FIG. 1 is seen in phantom in FIG. 2. Those bores which are blocked by core 2 communicate with passageway 8 only through passageway 17, but the rest of the bores communicate directly with passageway 8, as well as indirectly, through passageway 17. The right hand preform 11' from FIG. 1 is seen fitted closely to the tubesheet cap member 18, which is pierced by bores 20. Element 12 is the outer casing shell.

In view of the foregoing discussions, FIG. 3 does not require further description.

Assembly Procedures and Materials

The central core serves not only as a conduit but also as a mandrel on which the fiber bundle, tubesheet body member and end walls are built up. The permeate egress pipe, connecting block 9 and partition 10 will usually be preassembled and may be emplaced within the core either before or after the bundle assembly is formed. Passageways (30, FIG. 2) in the connecting block preferably are routed out before the block is slipped on (and bonded) to the closed end of pipe 7. A trench is machined in the surface of the peripheral portion of tubesheet body member 19 as a first step in forming permeate passageway 17. Bores 16 are drilled, along or parallel to a diameter, through the body member from the bottom of the trench to the core or all the way through to the trench again. Passageway 8 is drilled and routed out from one end to the other of a diameter (of the tubesheet body) generally perpendicular to bores 16 and is extended through the core wall, the connecting block 9 and the inner pipe 7. Openings 15 in the core wall, radial passageways 23,23' through the block and openings 24 in the permeate egress conduit are thus formed, in registration with each other and with passageway 8, during the latter operation. Cap member 18 is bonded to the body member 19 to complete the tubesheet. Bores 20 preferably are drilled before the latter step but may be formed afterwards. The inner casing preforms 11 are then slipped on from the ends of the core and bundle assembly and meet (are butted together) at the "equator" of cap member 18. The preforms may be bonded to each other and to the cap member to provide greater stiffness to the finished permeator. The exterior casing shell 12 is formed, in situ, in such manner that strong bonds are formed between it, the preforms and the protruding core ends. Fittings 27 – 29 are then formed or emplaced on the core ends and precut stacking blocks 13 are bonded to the casing.

In the embodiment of the invention illustrated in the drawings, the fiber bundle consists of essentially parallel fiber lengths (tows or hanks of individual, open-ended fibers or flattened, continuous loops). However, the bundle may consist of fiber lengths arrayed in any manner which is regular or non-random, i.e., which will permit space-efficient fiber packing, essentially uniform feed distribution throughout the bundle and equally low resistance to permeate flow through adjacent fiber lumens. Thus, now well known arrangements, in which the fibers are disposed in succesive, criss-crossed layers of spaced spirals around the core or are generally parallel to the core axis but cross each other at a shallow angle, may be employed. Additionally, the fiber bundle may include means, such as fabric wraps, for constraining the bundle and/or improving the uniformity of feed fluid distribution between the fibers that form it.

As a general rule, the tubesheet body member 19 and end walls will be built up by applying a suitable, flowable potting material (preferably a curable resinous composition) at appropriate rates at the center and ends of the bundle as it is being formed, and then solidifying the resulting bodies in place. Details of this procedure are well known to those skilled in the art.

Specific fiber/tubesheet assemblies of various types which may be adapted to the practice of the present invention are disclosed in the following U.S. Patents:

| U.S. Pat. No. | Type of Assembly |
|---|---|
| 3,422,008 | Hollow fibers spirally wrapped on a rotating core, terminal portions potted in one or more radial tubesheets; resin cut to open fiber ends. |
| 3,475,331 | Hollow fibers wound around a wobbling and rotating core like a ball of kite string and terminal portions potted in an equatorial tubesheet; drilled to open fiber ends. |
| 3,755,034 | Hollow fibers wrapped around pair of advancing filaments and resulting ladder rolled up on core as tubesheet resin applied at one or more locations; fiber ends opened by cutting resin in plane perpendicular to axis of bundle. |

Hollow fiber/tubesheet assemblies comprising tubesheets (or "wall members") at each end of the bundle may be adapted to use in the present invention by opening only one tubesheet in each of two such assemblies and then joining them end to end to form a single, unitary assembly which is approximately twice as long and has a central tubesheet and two "closed" end walls. When this is done, any method of opening the two halves of the central tubesheet may be used which adapts the final assembly to collect permeate from essentially all of the lumens in each half-bundle and to convey it to openings in the portion of the core wall surrounded by the tubesheet.

Thus, in one method, each of the two "tubesheets" to be joined may be cut in a place perpendicular to the bundle axis and the cut faces placed against opposite faces of an intervening, generally torroidal disc having a porous structure offering a low resistance to flow of permeate through it. A hoop-shaped cap, similar to element 18 in FIGS. 1 and 2, is bonded to the peripheral surfaces of the two tubesheet halves to prevent loss of permeate from the peripheral surface of the disc and to form a unitary "tubesheet" assembly. This method of course requires that abutting end portions of the two half-assembly cores be left protruding a total distance equal to the thickness of the porous disc. These portions should be foraminous in wall structure. When this assembly method is used, it is particularly convenient to insert the permeate egress pipe in one of the two core halves, then insert the connecting block (or functionally equivalent permeate conveying means) between the core and egress pipe. The two abutting core ends should be cemented together to ensure a maximum stiffening effect.

In another method of joining the two half-units, the cut faces (or the uncut faces, if sufficiently congruent) and the (appropriately cut) core ends may be bonded together and the resulting tubesheet "body member" adapted for permeate egress in the manner described for the embodiment illustrated in the drawings.

It will be apparent to those skilled in the art that in order to attain essentially uniform flow and pressure conditions in the two halves of the fiber bundle, the feed fluid should encounter progressively less resistance to flow through the core wall as it passes from the core inlet to the outlet. Although this can be done by bonding together end-butted core sections of different porosities, the strength advantages conferred by uninterrupted reinforcing filaments (as in fiberglass reinforced polyester pipe, for example) will not be attainable. A simpler and more preferred expedient is to drill holes in a unitary length of impervious tubing; the holes, according to their distance from the inlet, being made larger and/or spaced closer together. Of course, no holes are made in the portion of the core between the inlet and the part which will be surrounded by the end wall adjacent to the inlet.

The portion of the core which will be surrounded by the other end wall (i.e., the wall member adjacent to the outlet for treated feed) may initially be perforated. If it is, the perforations may be utilized to form and to help lock in place the partition (10, in FIG. 1) which will separate the treated and untreated feed streams. That is, the partition may be formed by slipping on two spaced apart annular metal or resinous discs (not shown in the drawings) and bonding them to the permeate egress pipe before it is inserted in the feed tube (core). A curable resin is then passed in through one or more of the perforations to fill the toroidal space defined by the exterior surface of the egress pipe, the internal surface of the core, the two discs and the rest of the perforations (between the discs). The resin is then cured in place, the choice of resin materials and the pressure applied to the resin being such as to ensure adequate bonding between the plug and the core and egress conduit surfaces. (Of course the egress pipe may also be perforated to help lock the partition in place, provided steps are taken to prevent excessive flow of the resin into the conduit interior.) The latter operation is closely analogous to making a cast in a mold which is filled through sprues.

A variety of materials (and methods) are known to be suitable for the preparation of hollow fibers having the requisite strength, chemical resistance and permeability properties for a diversity of separatory processes. Similarly, a variety of potting materials and several different methods for forming tubesheets or wall members from such materials are well known. Accordingly, no need to catalog suitable fiber and/or tubesheet materials is seen.

Suffice it to say that the present invention may be practiced with virtually any appropriate combination of fiber and tubesheet materials.

Casting materials suitable for the formation of the partition, as above discussed, are also well known. Good bonding between the partition and the core and permeate egress pipe walls is essential, at least when substantial transmembrane pressure differentials will be employed, and this will be a consideration in choosing an appropriate casting material (preferably a resin). However, those skilled in the art require no guidance in this respect either.

The short conduit means for conveying permeate from the tubesheet to the egress pipe (across the flow of feed between the core and said pipe) may be made of any otherwise suitable material which can be shaped in the requisite shape and sealingly engaged with the interior surface of the core and the exterior surface of the egress pipe. Preferably, a material will be chosen which can be machined accurately and adhesively bonded to the core and egress conduit materials. A cured, resinous connecting block (9, FIGS. 1-3) is a particularly suitable type of such conduit means which may be bonded to the egress pipe before the latter is positioned in the core. Perforations through the surrounding section of core wall may be utilized to introduce a cement or a small amount of the same (but uncured) resin of which the block is formed, in order to achieve the necessary engagement between the block and core. It does not matter if these perforations are filled in the process, because one or more passageways (such as 8, FIGS. 1 and 2, for example) will subsequently be cut through the tubesheet, the core wall and the block.

The core and the permeate egress pipe can be made of any suitable material but strong, lightweight materials are preferred. The egress pipe is pressured from the outside in and hence does not have to be as strong as the core; commercial polyvinylidene chloride-based (Saran-type) pipe extrusions are quite satisfactory for this use. Stronger materials, such as CPVC (chlorinated polyvinylchloride) and filament reinforced epoxies or polyesters are suitable core (and egress pipe) materials.

Similarly, the casing preforms must be strong enough to resist deformation under the substantial compression loads imposed by the winding process used to form the other casing shell. These preforms may be made in the manner now used to make molded tanks from cut lengths of reinforcing filaments (fiberglass) and resins.

It will be recognized that the permeate egress pipe can extend the entire length of the core if suitable end fittings are used so that the incoming feed and outgoing permeate can be kept separate. However, this may necessitate using a larger core (and modifying the pattern of bores through the core wall on each side of the tubesheet) in order to avoid excessive flow velocities in the first (or inlet) half of the core. Accordingly, this is a less preferred arrangement.

It will also be recognized that the wall member adjacent to the inlet end of the core can be extended to occupy all of the space between the casing and the fiber end potted in that wall member. When this is done, a space in which air and stagnant (treated) fluid could otherwise be trapped is eliminated and a greater binding area between the core and wall member is provided. This is accordingly a preferred option.

The piping connections on the ends of the core may be formed with the core as an integral unit (as shown in the drawings). However, this makes construction of the outer shell of the casing (the winding operation) somewhat more complicated, particularly at the outlet end where the fitting for treated feed discharge connects on the side of the core end. Accordingly, this is a less preferred option.

Well known commercial procedures may be employed to construct the outer casing shell from rovings of strong, reinforcing filaments impregnated with a curable (or self-curing) resin. Solid (or hollow) glass fibers are quite strong and are presently much less expensive than more exotic filaments, such as high strength carbon fibers. Accordingly, "fiberglass" is the preferred material of construction for the casing shell (and the core and permeate egress conduit). The resin-impregnated filament tow may be wound onto the preforms (and around the protruding core ends) on either a "lathe-type" or "racetrack" winding machine. The precessing, end-to-end wraps formed by the racetrack type of machine can be laid on over the end domes (of the preforms) as approximately true polar longitudinals. However, a combination of low-to-high angle helices and circumferentials is required when a lathe-type machine is used. The latter type of operation is more complicated and somewhat less efficient in utilizing the inherent strength of the reinforcing filaments. Thus, casing shells formed from filaments laid on in the manner of a racetrack-type winding machine are preferred.

It should be noted that it is the absence of lateral interruptions in the casing (as a consequence of using truly co-axial feed, reject and product conduits) which permits full advantage to be taken of the resistance to bursting pressures offered by filament and resin composites. Substantially greater amounts of fiberglass (etc.) and complicated winding patterns are required to compensate for the stresses which result when the casing is laterally interrupted, as by fluid conduits. A corollary, and highly desirable, result of eliminating side fittings is that permeators of the present invention require much less cumbersome external piping arrays and can be placed substantially closer together. These improvements are of great benefit in shipping, stacking, using and servicing the permeators.

Those familiar with the known art will also recognize the considerable simplification of internal structure achieved for high capacity permeators by the present invention. Metal parts, which are heavy, expensive and require the consumption of increasingly scarce and lower grade ores, are not employed and worn-out permeators of the present design need not be taken apart for salvage.

A particular advantage of the present invention is that the only change which must be made to adapt the permeator design for higher (or lower) working pressures is to increase (or decrease) the number of windings in the outer casing shell. This requires no changes in tooling or manufacturing procedures.

The drawings and the following example are intended for purposes of illustration and are not to be construed as limiting the invention to an extent inconsistent with the scope of the claims appended with these specifications.

EXAMPLE

Design parameters for a typical permeator of the preferred type (as shown in the drawings) adapted to produce up to 250,000 gallons per day of product water, are as follows:

Feed; 350 GPM (gallons per minute) of brackish water,

Reject; (treated feed) 175 to 105 GPM, at a product recovery of from 50 to 70% of feed.

Product; 175 to 245 GPM at 50 to 70% recovery, depending on salinity of feed and product specifications.

Fibers; hollow CTA (cellulose triacetate) fibers, 110–120 microns O.D. and about 90 microns I.D.

Bundle; About 24 inches in diameter by 8 feet long and consisting of from 10 to 20 million fiber lengths, depending on fiber packing density, presence or absence of restraining and flow directing means in bundle, contemplated operating pressures and feed and product compositions.

Operating Pressure; 250–400 psig for brackish water (800 psig minimum for sea water).

Conduit (etc.) Sizing; To maintain flow velocities at about 15 ft/sec or less, i.e., about 40 GPM per in$^2$ of flow path cross section, 350 GPM feed in left hand portion of core requires 8.75 in$^2$ of cross section, 175 GPM feed through wall of left portion of core requires about 4.4 in$^2$ of opening area, 175 GPM feed flow between core and egress conduit, and out through core wall requires about 4.4 in$^2$ cross section, 87.5 GPM of treated feed from left hand half of bundle requires 2.2 in$^2$ of cross-section total for bores (20, FIGS. 1 and 2) through cap member of tubesheet, Total 175 GPM of treated feed around right hand half of bundle and through portion of core wall between end wall and casing requires about 8.75 in$^2$ of cross-section.

Estimated Total Weight; About 1800–2000 lbs.

What is claimed is:

1. A hollow fiber permeator comprising:
   A. a casing having the general shape of an elongated cylinder closed at each end by a hemisphere, said casing being uninterrupted except at the ends thereof;
   B. a rigid, hollow core extending through said casing and having feed inlet and outlet ends protruding from and sealingly engaged with the ends of the casing, the axes of the casing and core generally coinciding;
   C. a plurality of fluid-permeable, hollow fiber lengths disposed as a non-random bundle around said core, within said casing;
   D. a radial tubesheet which is greater in diameter than said bundle, surrounds and sealingly engages an intermediate portion of said core and has adjacent, intermediate portions of said fiber lengths potted therein,
   said tubesheet having opposed, generally parallel faces from each of which unpotted portions of said fiber lengths extend and a peripheral portion extending radially outward beyond said fiber bundle,
   said peripheral portion of the tubesheet being spaced apart from said casing or being pierced from one of said faces to the other by a plurality of grooves in or bores adjacent to the peripheral surface between said faces,
   said intermediate core portion being pierced by at least one pair of opposed bores and said tubesheet defining internal passageways into which the lumens of said fiber lengths open and which are adapted to convey permeate from said lumens to said bores in the intermediate core portion;
   E. radial wall members at each end of said bundle, surrounding and sealingly engaged with said core and having potted therein the ends of said fiber lengths,
   the wall member adjacent the outlet end of said core being positioned relative to said casing and so adapted that treated feed may pass between the casing and said wall member, and
   the portions of the core engaged with said wall members and with the tubesheet, and the portion of the core between its inlet and the adjacent wall member being effectively fluid impervious but the rest of said core being adapted to permit flow of fluid to be treated into said bundle from said core or flow of treated fluid into said core from said space between the casing and the wall member adjacent said outlet;
   F. a permeate egress pipe disposed generally coaxially within said core and, together therewith, defining a feed passageway, of generally annular cross-section, extending from the core outlet at least to the plane of said tubesheet face furthest therefrom,
   the portion of said pipe surrounded by the tubesheet being pierced by at least one pair of opposed bores for permeate ingress thereto but being otherwise closed to fluid entry;
   G. a partition sealingly engaged with the core and said pipe and dividing said feed passageway into a terminal section extending from said core exit to the adjacent wall member and an inner section extending at least from that wall member to said face plane;
   H. conduit means disposed within but not blocking off said feed passageway and connecting said bores in the intermediate core portion with the permeate ingress bores in said pipe;
   said core outlet and the adjacent pipe end being adapted to discharge treated fluid and permeate, respectively, as separate streams.

2. A permeator according to claim 1 in which said casing comprises an inner structure, consisting of abutted preforms, and an outer shell comprising a continuous wind of a reinforcing filament imbedded in a cured resin body.

3. A permeator as in claim 2 in which said tubesheet comprises:
   (1) a generally toroidal, resinous body member of greater diameter than said fiber bundle and having a peripheral surface shaped to define a trench in the portion of said body member extending radially outward from said fiber bundle,
   said body member being pierced by a plurality of spaced apart, generally parallel permeate-collecting bores, one end of each of which opens into said trench and the other end either opens into said trench or terminates at the core wall, the number and locations of said bores being such that the lumen of essentially every fiber length potted in said body member is cut by and opens into one of said collecting bores,
   said body member also being pierced, along a diameter which is generally perpendicular to the axes of said permeate collecting bores, by two coaligned header passageways, each of which opens at one end in said trench and connects at the other end to one of said opposed bores in said intermediate core portion, said header passageways intersecting and dividing into two sections each of said permeate collecting bores which does not terminate at the core wall; and (2) A generally hoop-shaped cap member which encircles and sealingly engages the body member, thereby converting said trench to an enclosed passageway connecting said header passageway with those of said collecting bores which terminate at the core wall.

4. A permeator as in claim 2 in which said preforms comprise lengths of reinforcing filaments embedded in a cured resin.

5. A permeator as in claim 2 wherein said tubesheet and said wall members each are generally torodial bodies of a cured, resinous potting composition.

6. A permeator as in claim 2 wherein there is essentially no void space between the wall member adjacent to the inlet end of said cure and the section of said casing from which said core end protrudes.

7. A permeator as in claim 2 in which said core is formed of lengths of reinforcing filaments embedded in a cured resin.

8. A permeator as in claim 2 in which said conduit means is a thick-walled cylinder, the wall of which is pierced from end to end by at least one pair of longitudinal bores, the axes of which lie generally in a common plane with the cylinder axis, said wall also being transversely pierced by a pair of opposed bores which do not intersect said longitudinal bores.

9. A permeator according to claim 3 in which said cap member is pierced from one of said tubesheet faces to the other by a plurality of bores, adjacent to the peripheral surface of said cap member, through which treated feed may pass from one side of said tubesheet to the other, and is bonded to said casing.

10. A permeator as in claim 3 in which:
  a. said wall members are each generally toroidal bodies of cured resin,
  b. said core is formed of lengths of reinforcing filaments embedded in a cured resin,
  c. said conduit means is a thick-walled cylinder, the wall of which is pierced from end to end by at least one pair of longitudinal bores, the axes of which lie generally in a common plane with the cylinder axis, said wall also being transversely pierced by a pair of opposed bores which do not interest said longitudinal bores, and
  d. said cap member is pierced from one of said tubesheet faces to the other by a plurality of bores, adjacent to the peripheral surface of said cap member, through which treated feed may pass from one side of said tubesheet to the other, and is bonded to said casing.

11. A permeator as in claim 10 in which there is essentially no void space between the wall member adjacent to the inlet end of said cure and the section of said casing from which said core end protrudes.

12. A permeator as in claim 11 in which said cap member and said permeate egress pipe are each formed of reinforcing filaments embedded in a cured resin.

* * * * *